US012202261B2

(12) United States Patent
Noguchi

(10) Patent No.: US 12,202,261 B2
(45) Date of Patent: Jan. 21, 2025

(54) INK JET RECORDING APPARATUS

(71) Applicant: CANON KABUSHIKI KAISHA, Tokyo (JP)

(72) Inventor: Hiroyuki Noguchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 43 days.

(21) Appl. No.: 17/726,380

(22) Filed: Apr. 21, 2022

(65) Prior Publication Data

US 2022/0339928 A1 Oct. 27, 2022

(30) Foreign Application Priority Data

Apr. 27, 2021 (JP) ................................ 2021-075041

(51) Int. Cl.

*B41J 2/045* (2006.01)
*B41J 2/165* (2006.01)
*B41J 2/175* (2006.01)

(52) U.S. Cl.

CPC ......... *B41J 2/0451* (2013.01); *B41J 2/17503* (2013.01); *B41J 2002/16582* (2013.01)

(58) Field of Classification Search

CPC .... B41J 2/17503; B41J 2/175; B41J 2/04503; B41J 19/202; B41J 2/0451; B41J 2002/16582; B41J 19/205; B41J 19/207; B41J 29/38; B41J 29/393; B41J 29/02; B41J 25/304; B41J 19/305

See application file for complete search history.

(56) References Cited

U.S. PATENT DOCUMENTS

2017/0015103 A1* 1/2017 Ueki .................... B41J 2/17546
2018/0072077 A1* 3/2018 Iioka ...................... B41J 19/202

FOREIGN PATENT DOCUMENTS

| | | | | |
|---|---|---|---|---|
| JP | 2006192819 | A | | 7/2006 |
| JP | 2006218756 | A | | 8/2006 |
| JP | 2008229922 | A | | 10/2008 |
| JP | 2012020407 | A | | 2/2012 |
| JP | 2014-240141 | A | | 12/2014 |
| JP | 2017056604 | A | * | 3/2017 |
| JP | 2017065061 | A | | 4/2017 |

* cited by examiner

*Primary Examiner* — Jannelle M Lebron

(74) *Attorney, Agent, or Firm* — Canon U.S.A., Inc. IP Division

(57) ABSTRACT

A recording apparatus includes a carriage equipped with a recording head that ejects ink to a sheet, a drive unit configured to move the carriage in a width direction of the sheet, an encoder configured to detect first information regarding a position or a velocity of the carriage that moves by the drive unit, an acceleration sensor arranged on the carriage and configured to detect second information regarding acceleration of the carriage, and a control unit configured to stop the carriage, based on the first information and the second information.

9 Claims, 14 Drawing Sheets

INK JET RECORDING APPARATUS

BACKGROUND

Field of the Disclosure

The present disclosure relates to an ink jet recording apparatus equipped with a recording head that ejects ink.

Description of the Related Art

Japanese Patent Application Laid-Open No. 2014-240141 discusses an ink jet recording apparatus that records an image on a sheet by moving a carriage equipped with a recording head that ejects ink. The ink jet recording apparatus includes a carriage motor for a reciprocating movement of the carriage and a carriage encoder for detecting a position of the carriage. Accordingly, detection of whether the carriage is in a normal state can be performed based on a driving current of the carriage motor and the carriage encoder.

SUMMARY

According to an aspect of the present disclosure, a recording apparatus includes a carriage equipped with a recording head that ejects ink to a sheet, a drive unit configured to move the carriage in a width direction of the sheet, an encoder configured to detect first information regarding a position or a velocity of the carriage that moves by the drive unit, an acceleration sensor arranged on the carriage and configured to detect second information regarding acceleration of the carriage, and a control unit configured to stop the carriage, based on the first information and the second information.

Further features of the present disclosure will become apparent from the following description of exemplary embodiments with reference to the attached drawings.

DESCRIPTION OF THE EMBODIMENTS

Figure 1:
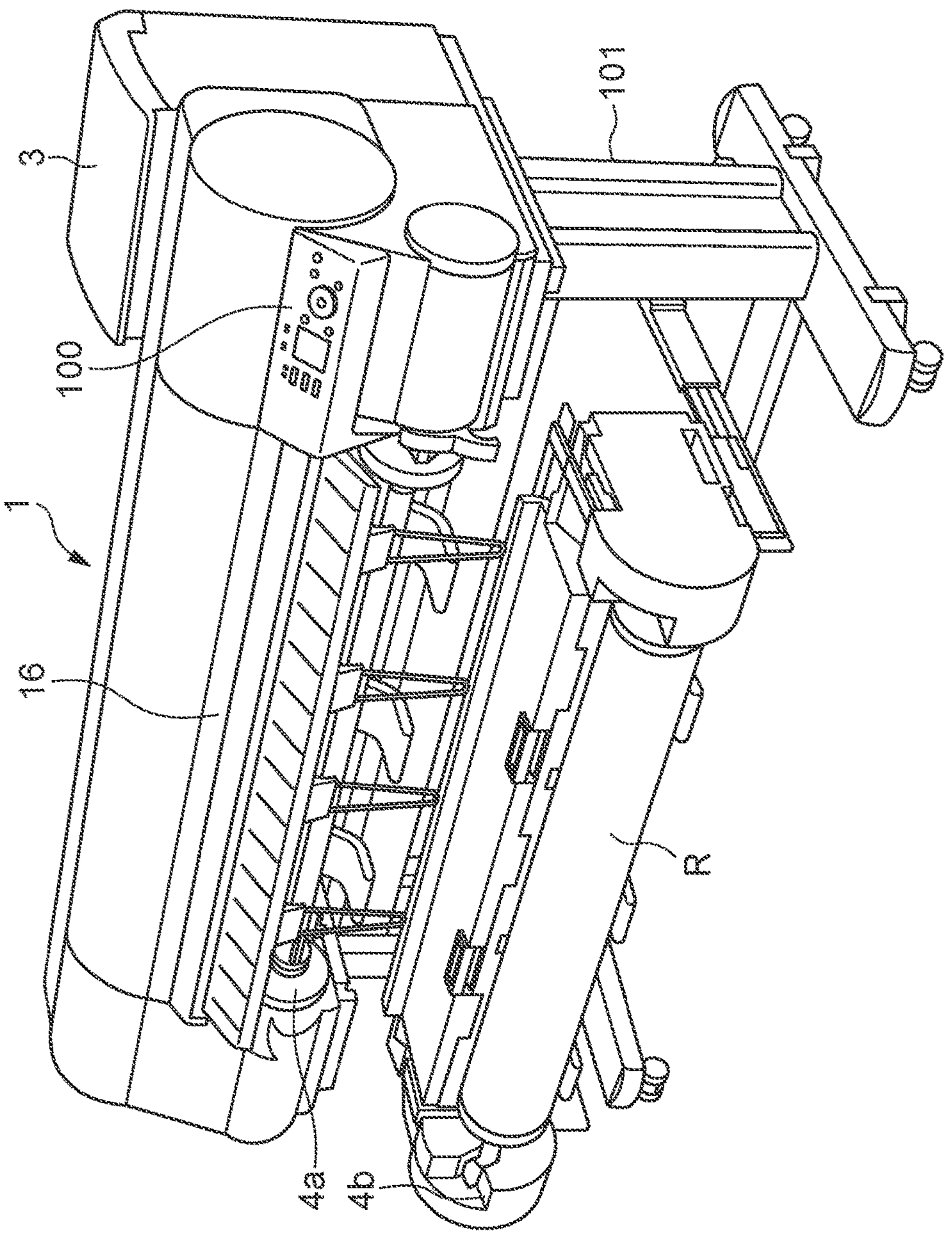
FIG. 1 is an external perspective view of a recording apparatus.

Exemplary embodiments according to the present disclosure will be described below with reference to the attached drawings. It is noted that the following exemplary embodiments are not meant to limit the scope of the present disclosure. Further, not all combinations of features described in the exemplary embodiments are essential for solving means of the present disclosure. The same components are described with the same reference numerals. Relative arrangements, shapes, and the like of the components described in the exemplary embodiments are merely examples and are not intended to limit the scope of the present disclosure. Therefore, the present disclosure can be implemented in various other forms, and various omissions, replacements, combinations, and modifications of the embodiments can be made without departing from the gist of the present disclosure.

<Ink Jet Recording Apparatus>

Figure 2:
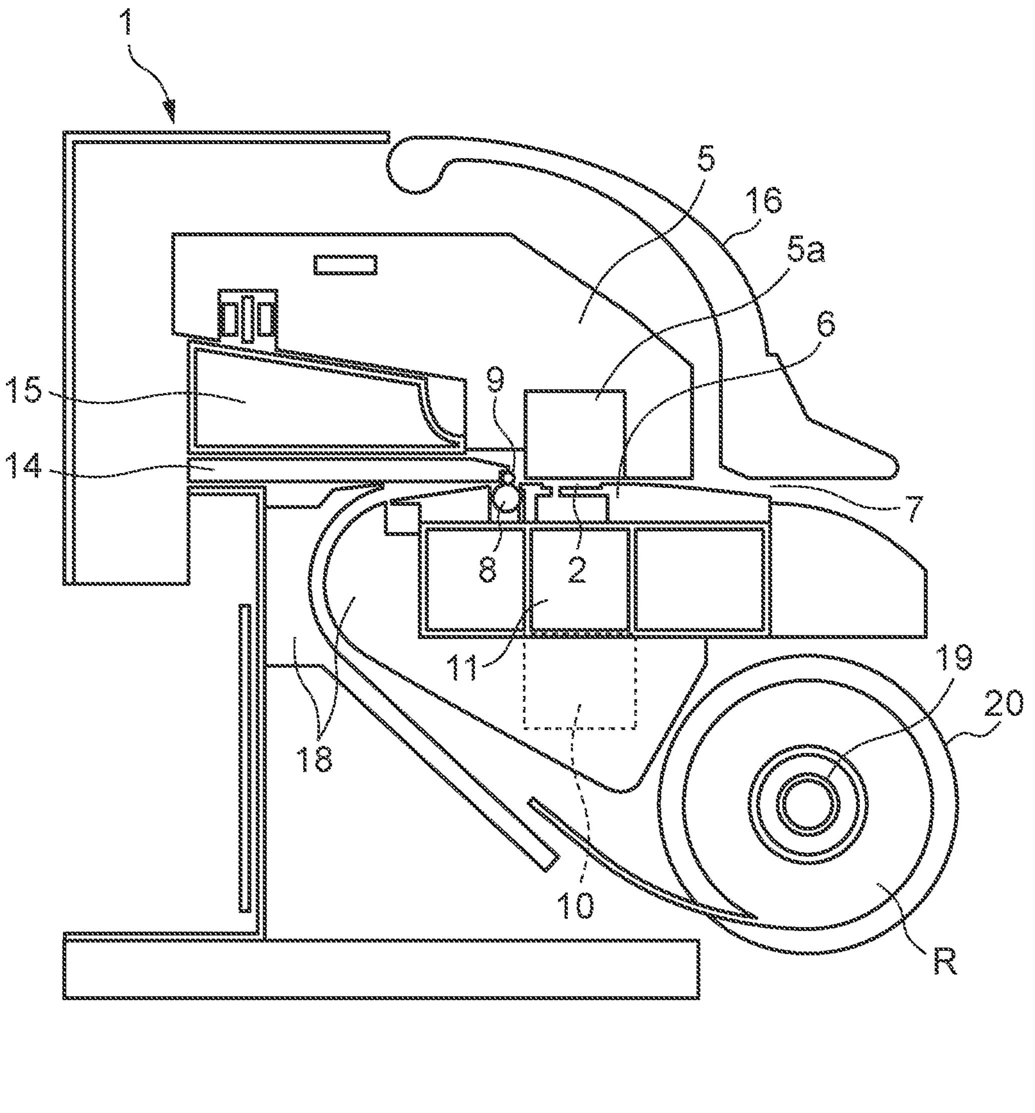
FIG. 2 is a cross-sectional view illustrating a main part of the recording apparatus.
Figure 3:
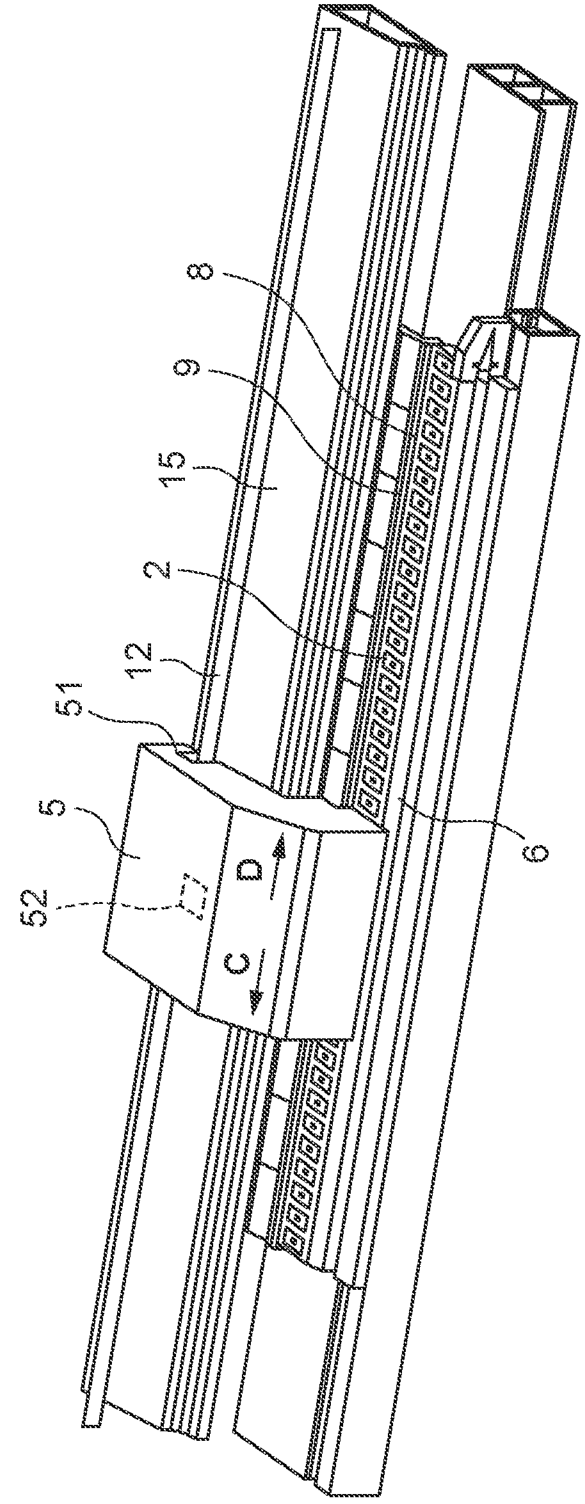
FIG. 3 is a perspective view of a portion where a carriage moves.
Figure 4:
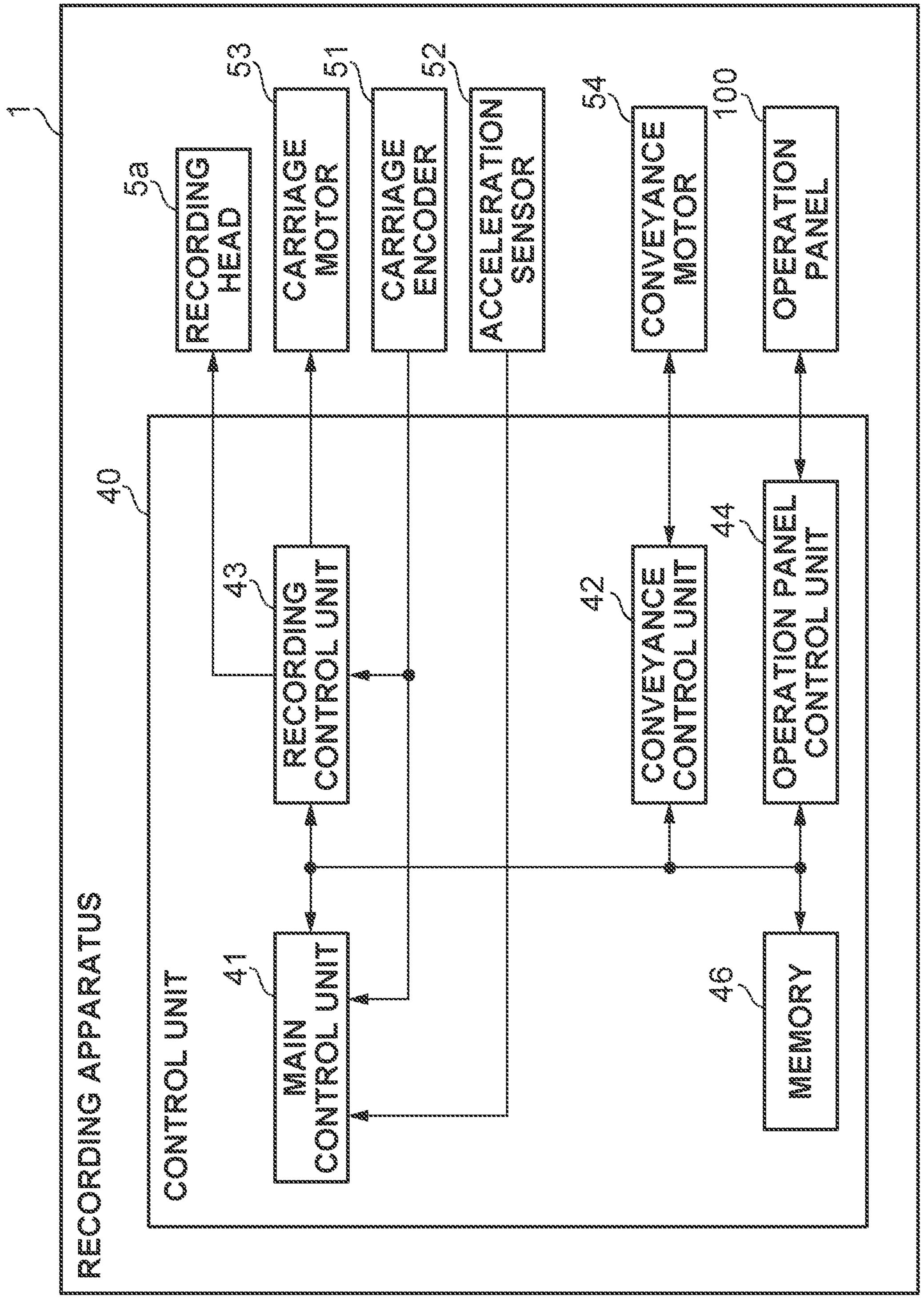
FIG. 4 is a block diagram illustrating a control system of the recording apparatus.

An ink jet recording apparatus (herein, referred to as a recording apparatus 1) according to the present exemplary embodiment is described with reference to FIGS. 1 to 4. The recording apparatus 1 can print an image on an A0 size sheet and a B0 size sheet. FIG. 1 is an external perspective view of the recording apparatus 1. FIG. 2 is a cross-sectional view illustrating a main part of the recording apparatus 1. FIG. 3 is a perspective view of a portion where a carriage moves. FIG. 4 is a block diagram illustrating a control system of the recording apparatus 1.

The recording apparatus 1 can set a roll sheet R in each supply unit 20 on an upper stage 4*a* and a lower stage 4*b* on a front side of the recording apparatus 1. The roll sheet R is formed by rolling a long sheet having a width of 10 to 60 inches. A discharging port 7 for discharging a sheet on which an image is recorded is provided on an upper side of the supply unit 20. An operation panel 100 functions as an operation unit for performing various settings and a display unit for displaying a state of the recording apparatus 1. The inside of the recording apparatus 1 is provided with a recording head 5*a* that is mounted on a carriage 5 and performs recording while ejecting ink.

The carriage 5 can move the recording head 5*a* in a main scanning direction, which is a width direction of a sheet. An apparatus cover 16 can be rotated to a position at which the carriage 5 is covered and to a position at which the carriage 5 can be accessed. An ink tank for supplying ink to the recording head 5*a* is disposed on a rear side of the recording apparatus 1. A user can replace the ink tank by opening an ink tank cover 3.

The supply unit 20 can supply the sheet to a recording area 2 by rotating the roll sheet R. The supply unit 20 rotatably holds the roll sheet R to which a spool shaft 19 is attached. The sheet supplied from the supply unit 20 passes through a conveyance guide pair 18 having a U-shape and is nipped by a conveyance roller 8 and a pinch roller 9. The pinch roller 9 is supported by a pinch roller holder 14 and is in press contact with the conveyance roller 8. The conveyance roller 8 is driven by a conveyance motor 54 and conveys the sheet to the recording area 2. In this process, a braking force is always applied to the spool shaft 19 of the supply unit 20 by an action of a torque limiter (not illustrated). Thus, tension acts on the supplied sheet. Accordingly, the sheet is not loose in a conveyance path.

In FIG. 3, the carriage 5 moves in a forward direction C from one side end portion of the sheet on a conveying-reference side on which the operation panel 100 is disposed. Then, when the carriage 5 reaches the other side end portion of the sheet, the carriage 5 moves in a backward direction D to the conveying-reference side. The carriage 5 is driven by a carriage motor 53 serving as a drive unit, and thus moves. A scale film 12 has slits 21 at equal intervals in the main scanning direction and is supported at both ends by support members on a structure 15 of the recording apparatus 1. The carriage 5 is provided with the recording head 5*a*, a carriage encoder 51, and an acceleration sensor 52. The carriage encoder 51 can optically detect the slits 21 of the scale film 12. The acceleration sensor 52 can detect information regarding acceleration of the carriage 5. The acceleration sensor 52 is a capacitance type sensor using a micro electro mechanical system (MEMS) technology. According to the present exemplary embodiment, the acceleration sensor 52 detects information regarding acceleration in the main scanning direction of the carriage 5. The acceleration sensor 52 may be of a type that can detect three axes including the main scanning direction. A platen fan 10 is disposed below a buffer chamber disposed below a platen 6. The platen fan 10 can suck air through many holes on the platen 6. Thus, the sheet is attracted to the platen 6 and hardly floats up.

The recording head 5*a* having a plurality of nozzles that ejects ink is mounted on the carriage 5. The recording head 5*a* faces the platen 6 and records an image on the sheet supported by the platen 6 from the back. Specifically, the carriage 5 is moved in the forward direction C or the backward direction D by the carriage motor 53 while the sheet is stopped. In this process, the recording head 5*a* ejects ink to the sheet using an ink jet method and performs recording corresponding to a length of the recording head 5*a* in a conveyance direction. After an image recording operation for one scan, the sheet pinched by the conveyance roller 8 and the pinch roller 9 is conveyed for a predetermined amount in the conveyance direction orthogonal to the main scanning direction. The image recording operation and a sheet conveyance operation are alternately repeated, whereby an image is recorded in a desired area of the sheet. In this process, the number of times for superimposing images in the recording in the conveyance direction is different based on a type of the sheet and a recording mode set by a user, such as a high definition recording mode, a normal recording mode, and a high speed recording mode. Thus, a conveyance amount at which the sheet is conveyed is different based on the recording mode. The sheet on which the image has been recorded is gradually discharged from the discharging port 7 and is cut by a cutter (not illustrated) at a trailing edge.

The control system of the recording apparatus 1 is described with reference to FIG. 4. The recording apparatus 1 includes a control unit 40, and the control unit 40 is provided with a main control unit 41, a conveyance control unit 42, a recording control unit 43, an operation panel control unit 44, and a memory 46. The main control unit 41 includes a central processing unit (CPU), a read only memory (ROM), and a random access memory (RAM) and executes a sheet supply operation, the image recording operation, the sheet conveyance operation, and the like of the recording apparatus 1. Thus, the main control unit 41 controls motors, the recording head 5*a*, the operation panel 100, and the like via the conveyance control unit 42, the recording control unit 43, and the operation panel control unit 44. Further, the main control unit 41 can acquire signals including information from the carriage encoder 51 and the acceleration sensor 52.

The conveyance motor 54 is controlled by the conveyance control unit 42. The carriage motor 53 and the recording head 5*a* are controlled by the recording control unit 43 based on a signal output from the carriage encoder 51. The operation panel 100 is controlled by the operation panel control unit 44. The main control unit 41 controls the conveyance control unit 42, the recording control unit 43, and the operation panel control unit 44, based on signals from the acceleration sensor 52 and the carriage encoder 51.

The carriage motor 53 is feedback controlled via the recording control unit 43. In the feedback control, first, a signal output from the carriage encoder 51 is input to the recording control unit 43. Next, the main control unit 41 calculates a velocity of the carriage 5 from the signal. Then, the main control unit 41 controls drive of the carriage motor 53 to adjust the velocity of the carriage 5 to be a target value. In a case where the velocity of the carriage 5 is less than the target value, a driving force of the carriage motor 53 is increased, and the velocity of the carriage 5 is more than the target value, the driving force is reduced. In this process, acceleration acts on the carriage 5, and information regarding the acceleration can be detected by the acceleration sensor 52.

<Carriage Encoder>

Figure 5:
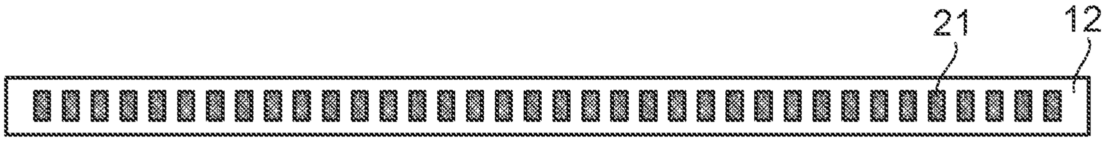
FIG. 5 is a diagram illustrating a structure of a scale film.
Figure 6A:
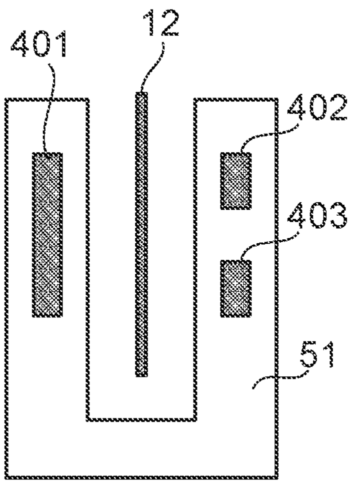
FIGS. 6A and 6B are diagrams illustrating a relationship between a carriage encoder and the scale film.
Figure 6B:
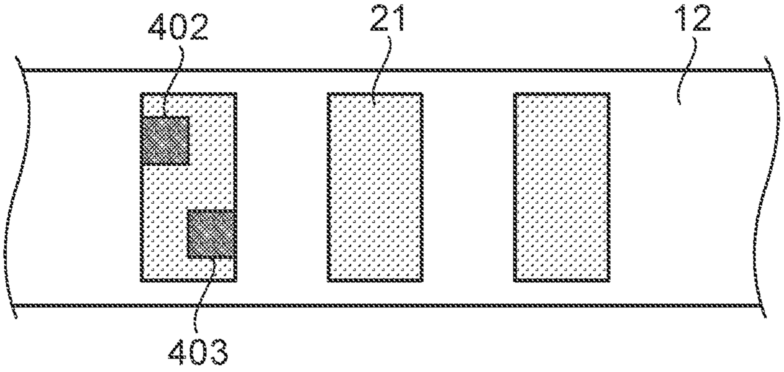
Figure 7:
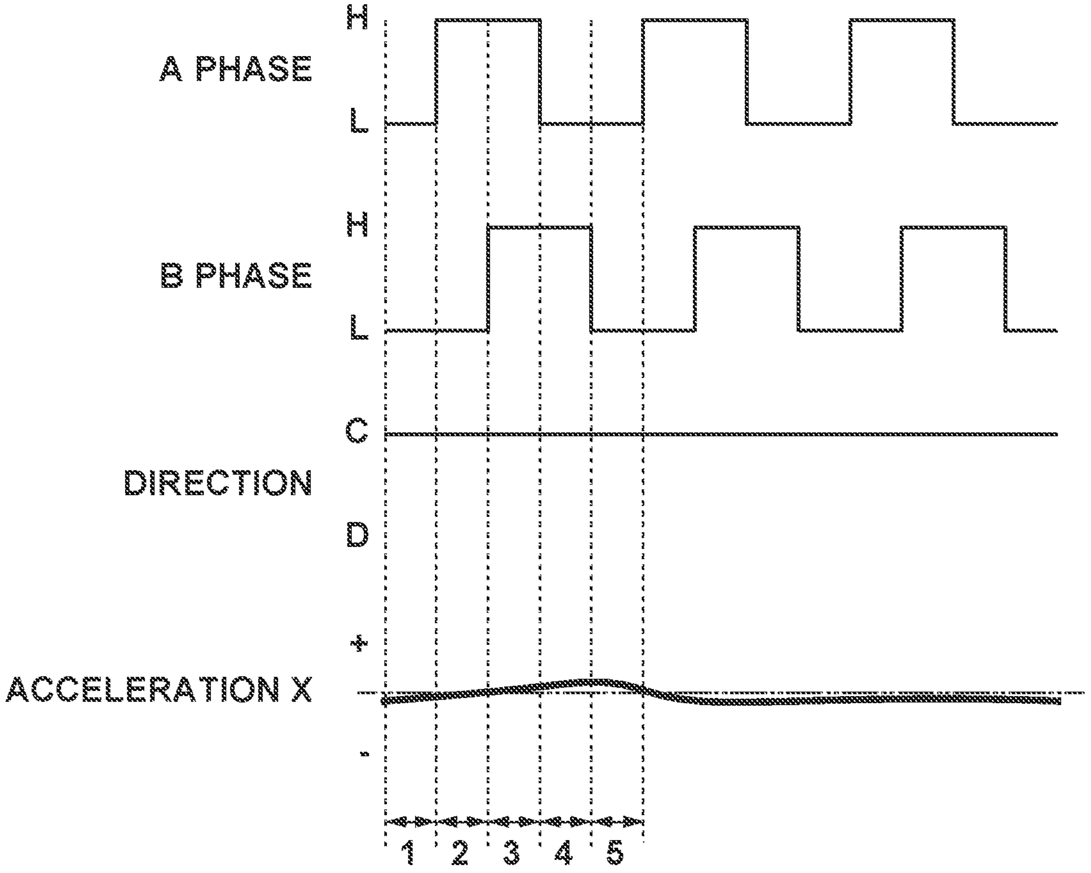
FIG. 7 is a diagram illustrating an output, a movement direction, and acceleration of the carriage encoder.
Figure 8:
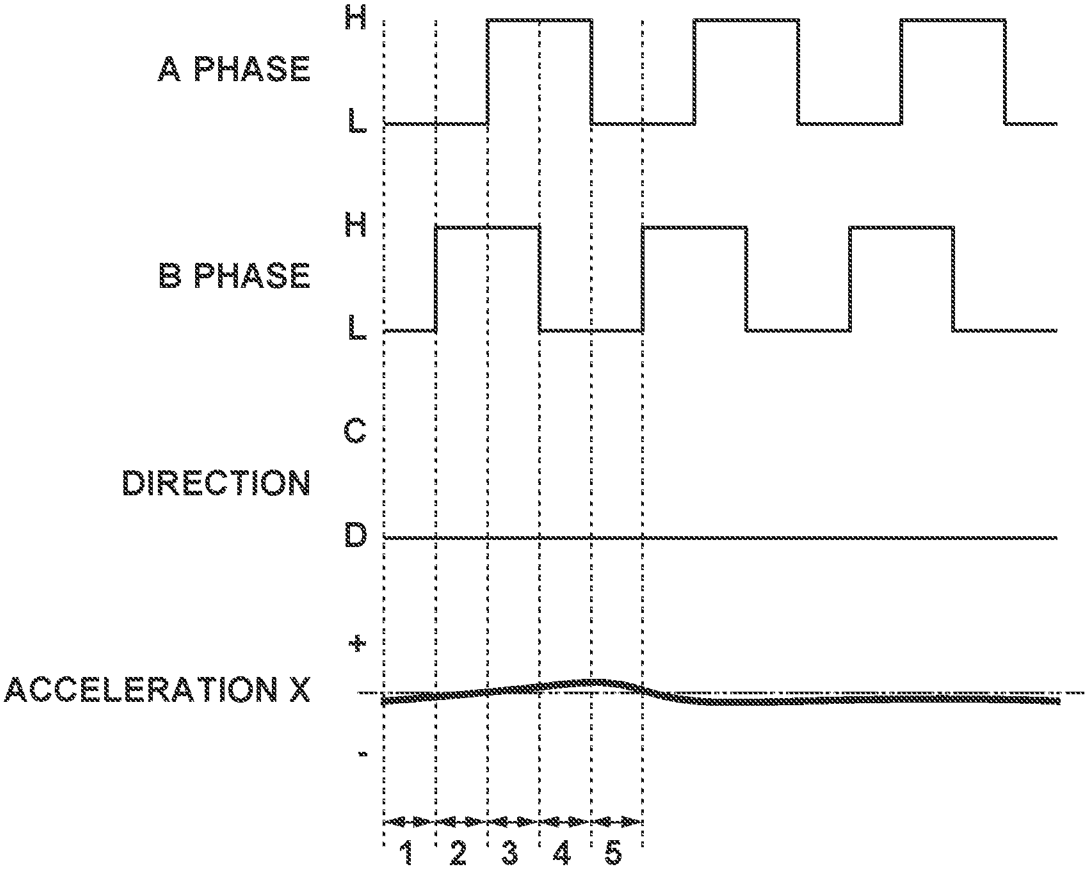
FIG. 8 is a diagram illustrating the output, the movement direction, and the acceleration of the carriage encoder.

Detection of information regarding a position or the velocity of the carriage 5 by the carriage encoder 51 is described with reference to FIGS. 5 to 10. FIG. 5 illustrates a structure of the scale film 12. FIGS. 6A and 6B illustrate a positional relationship of the carriage encoder 51 and the scale film 12. FIGS. 7 and 8 illustrate an output, a movement direction, and acceleration of the carriage encoder 51 in a case where a movement direction of the carriage 5 is different.

The scale film 12 has a structure in which the slits 21 serving as light transmission portions for transmitting light are arranged at equal intervals in the main scanning direction. In other words, the slit 21 that is the light transmission portion and a non-transmission portion that does not transmit light are alternately arranged in the scale film 12. The carriage encoder 51 includes a light emitting portion 401 that is a light source, and light receiving portions 402 and 403, that are disposed on an upper side and a lower side, respectively, and receive the light. The light emitting portion 401 faces the light receiving portions 402 and 403 in the conveyance direction of the sheet. The scale film 12 is disposed to be held between the light emitting portion 401 and the light receiving portions 402 and 403. The light receiving portion 402 is disposed at a position shifted from a position of the light receiving portion 403 by a quarter period of a scale interval in the main scanning direction of the scale film 12. An output from the light receiving portion 402 corresponds to an A phase of the carriage encoder 51, and an output from the light receiving portion 403 corresponds to a B phase of the carriage encoder 51. An output at a timing of when the carriage encoder 51 passes by the slit 21 serving as the light transmission portion is "High (H): 1", and an output at a timing of when the carriage encoder 51 is at a position other than the slit 21, i.e., the non-transmission portion, is "Low (L): 0". Edges of the outputs from the light receiving portions 402 and 403 of the carriage encoder 51 are analyzed, whereby the movement direction of the carriage 5 can be detected. Since a distance between the slit 21 and the portion other than the slit 21 in the scale film 12 is specified, a movement distance of the carriage 5 can be calculated from the output of the carriage encoder 51.

The carriage 5 moves in the forward direction C in FIG. 7 and moves in the backward direction D in FIG. 8. The carriage encoder 51 detects the position of the carriage 5 based on 2-bit information using the A phase as a most significant bit (MSB) and the B phase as a least significant bit (LSB). The B phase has a phase difference of a quarter period with respect to the A phase. In a movement of the carriage 5 in the forward direction C, the output of the carriage encoder 51 changes from 00, 10, 11, 01, to 00 in intervals 1 to 5 in FIG. 7. Since a rising or falling edge appears in the order of the A phase and the B phase, it can be determined that the carriage 5 moves in the forward direction C. In a movement of the carriage 5 in the backward direction D, the output of the carriage encoder 51 changes from 00, 01, 11, 10, to 00 in intervals 1 to 5 in FIG. 8. Since a rising or falling edge appears in the order of the B phase and the A phase, it can be determined that the carriage 5 moves in the backward direction D. The position of the carriage 5 is calculated using a position counter. In a case of the movement in the forward direction C, the position counter is counted up in reference to the origin, and in a case of the movement in the backward direction D, the position counter is counted down.

A value of the position counter is acquired in a fixed cycle. A movement velocity of the carriage is calculated from a difference between the position counters and a time difference acquired when the values of the position counters are acquired. In the feedback control, the carriage motor 53 is controlled to adjust the movement velocity to be close to a target velocity. In this process, the main control unit 41 performs velocity control at time intervals that are counted in units of several tens of pulses to prevent the velocity control from becoming too sensitive. Accordingly, even in a case where several pulses are missed, the velocity does not change significantly. In a case where the carriage 5 moves near the target velocity, the output of the acceleration sensor 52 does not change significantly beyond a positive or negative threshold value. Meanwhile, ejection of ink from the recording head 5*a* is controlled by a single pulse unit of the carriage encoder 51. Accordingly, if several pulses are missed, deterioration occurs in a recorded image. In FIGS. 7 and 8, the value of the acceleration sensor 52 changes positively and negatively because the acceleration sensor 52 reacts to the movement of the carriage 5 even when the carriage 5 moves at a constant velocity.

Figure 14C:
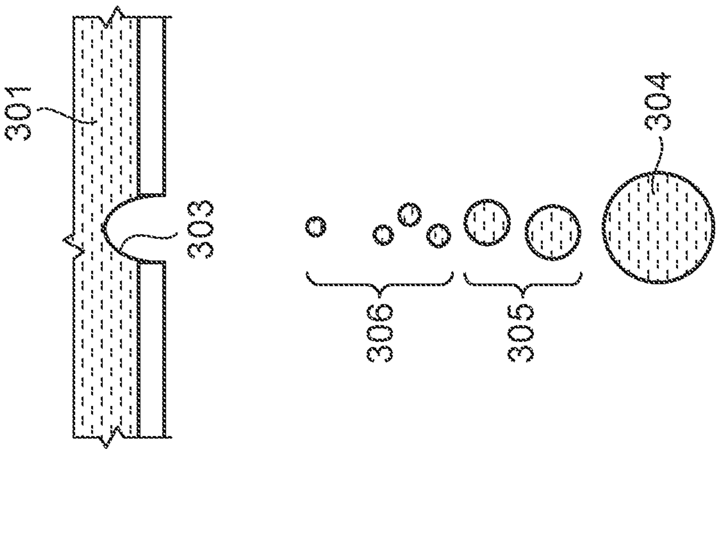
FIGS. 14A to 14C are diagrams illustrating a mechanism of ink mist generation associated with ink ejection.
Figure 14B:
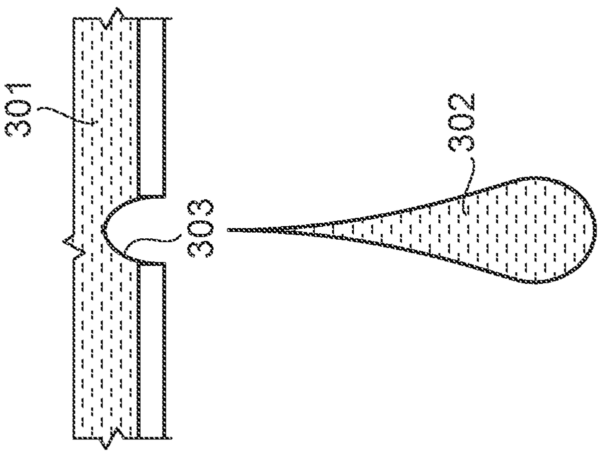
Figure 14A:
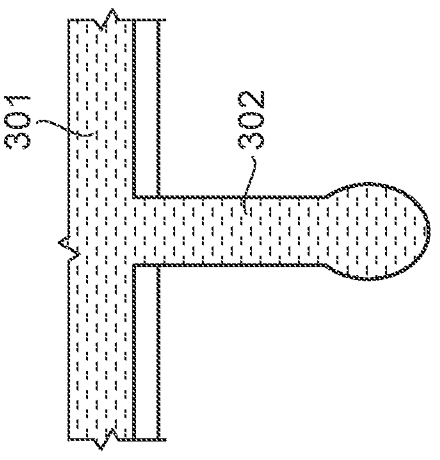

A cause of a stain on the scale film 12 is described. The stain is ink mist associated with ejection of ink from the recording head 5*a*. FIGS. 14A to 14C illustrate a vicinity of an ejection port of the recording head 5*a* and states of ink ejected Immediately after the ink ejection is started from the ejection port of the recording head 5*a*, columnar ink 302 is formed (FIG. 14A). Next, after drive for ejection, a meniscus 303 curves upward. More specifically, ink 301 moves to the inside of the recording head 5*a* due to a negative pressure at the time of ink shrinkage. When the retracting ink and the ejected ink are separated, velocity distribution is generated in the columnar ink 302 due to surface tension of the ink. Then, the ink in which the velocity distribution is generated is roughly divided into three parts. That is, an ink drop (a main drop 304) having a largest volume and velocity, an ink drop (a satellite 305) having a volume and velocity smaller than the main drop 304, and ink mist 306 having a further smaller volume and velocity (FIG. 14C). The ink mist 306 loses its velocity in an ejection direction during flying and eventually floats in the recording apparatus 1. Normally, the ink mist 306 is collected by an ink mist collection mechanism (not illustrated). However, in a case where the image recording operation with a large amount of ink ejection is continuously performed, the ink mist may not be sufficiently collected. Accordingly, the ink mist, which is failed to be collected, adheres to the scale film 12 and the like and becomes a stain.

Figure 9:
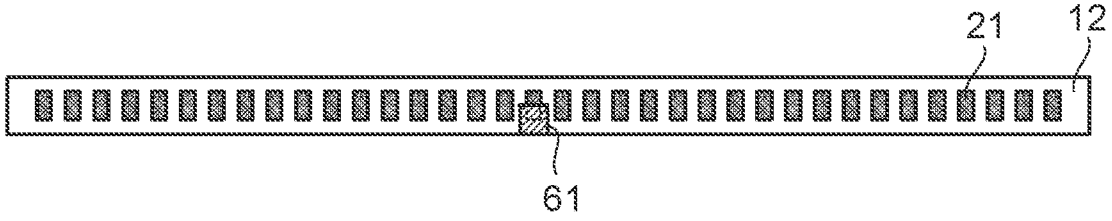
FIG. 9 is a diagram illustrating the scale film to which a stain is attached.
Figure 10:
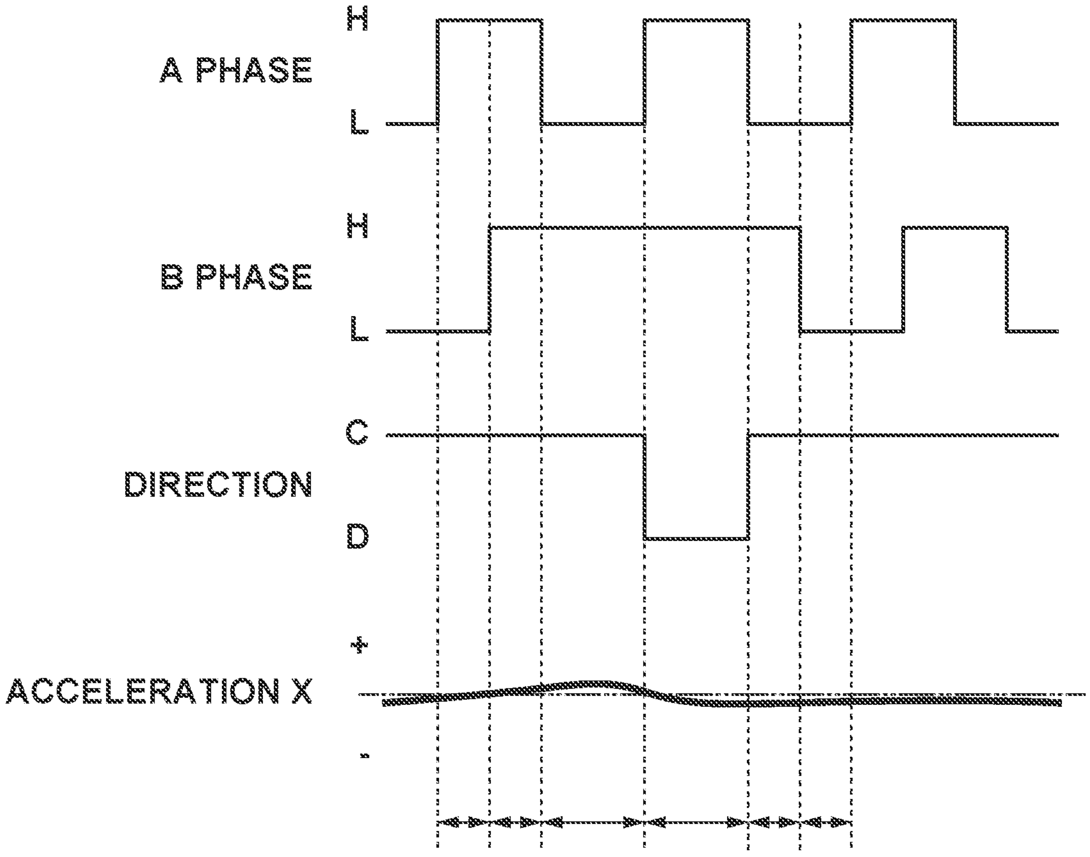
FIG. 10 is a diagram illustrating the output, the movement direction, and the acceleration of the carriage encoder in a case where the scale film has a stain.

FIG. 9 illustrates the scale film 12 with a stain. FIG. 10 illustrates the output, the movement direction, and the acceleration of the carriage encoder 51 in a case where the scale film 12 has a stain. Examples of a case where a stain 61 occurs on the scale film 12 include a case where recording with a large amount of ink ejection is continued for a sheet having a width shorter than a maximum sheet width that can be recorded by the recording apparatus 1. More specifically, an amount of the ink mist increases at a specific position near a side end portion of the sheet, and thus the ink adheres to the scale film 12. In a case where the scale film 12 has the stain 61, for example, the A phase of the carriage encoder 51 can be detected, but the B phase cannot be detected. Thus, a pulse is missed in the B phase as illustrated in FIG. 10. In this case, when the carriage 5 passes by the stain 61, the output of the carriage encoder 51 shows that the movement direction of the carriage 5 is changed from the forward direction C to the backward direction D. Meanwhile, since the carriage 5 keeps moving at the constant velocity, acceleration X from the acceleration sensor 52 does not show a significant output change such as an excessive value exceeding the positive or negative threshold value. Thus, in a case where the movement direction changes, but the acceleration X does not significantly change, it can be determined that a pulse is missed due to the stain 61 on the scale film 12.

Figure 11:
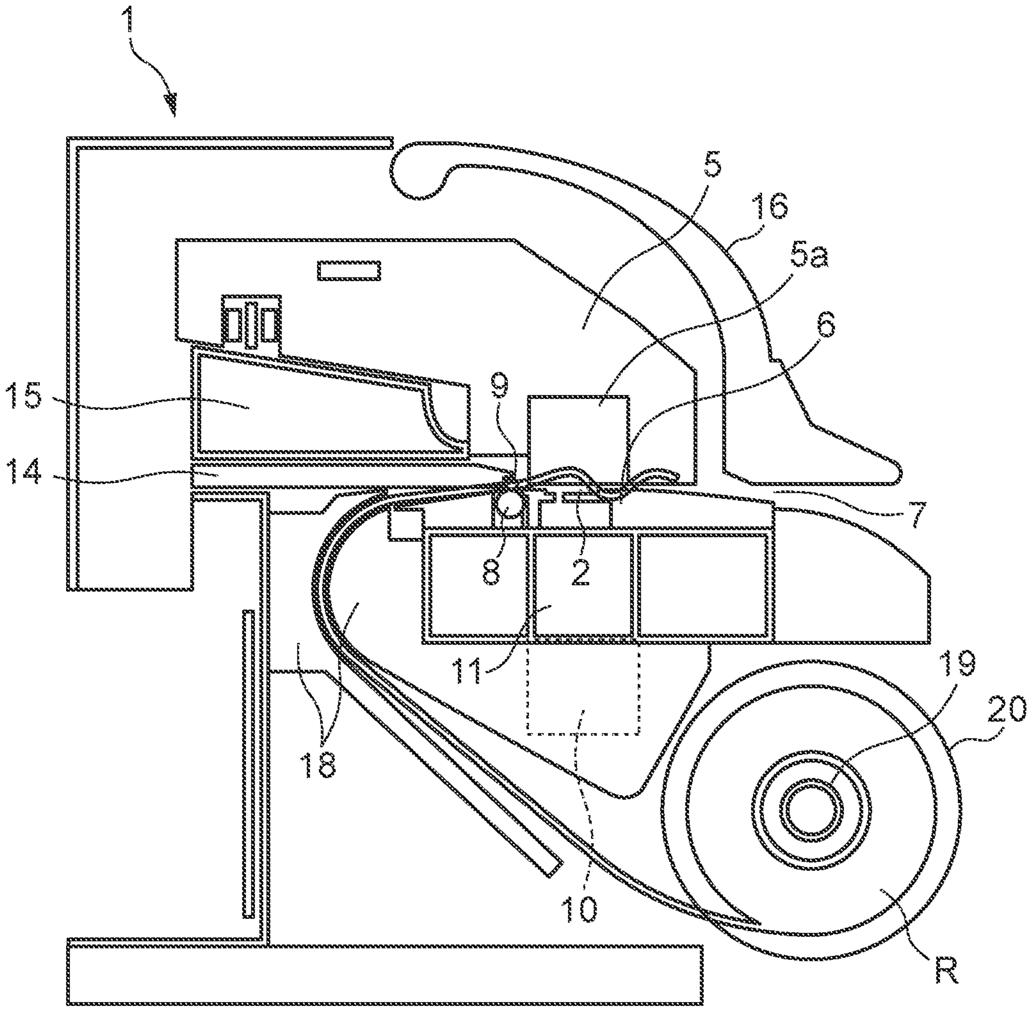
FIG. 11 is a diagram illustrating a case in which a sheet is jammed during an image recording operation.
Figure 12:
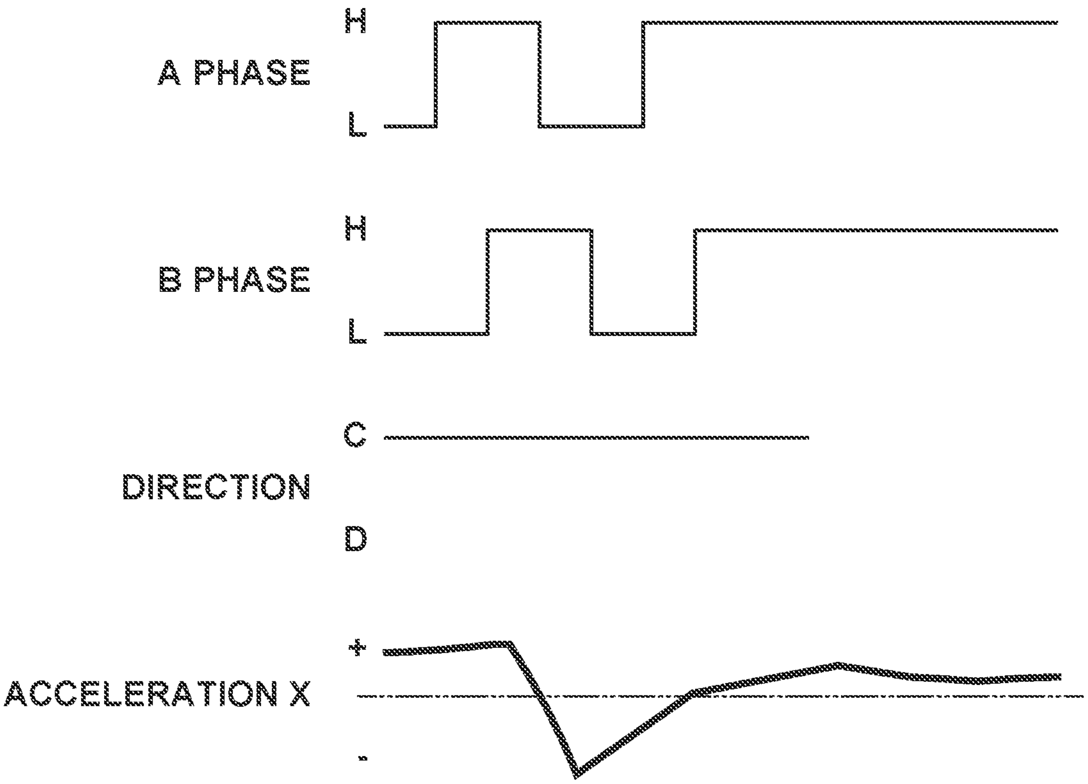
FIG. 12 is a diagram illustrating the output, the movement direction, and the acceleration of the carriage encoder in a case where a sheet is jammed.

FIG. 11 illustrates a state in which a sheet is jammed during the image recording operation, and the recording head 5*a* collides with the sheet. FIG. 12 illustrates states of the output and the acceleration X of the carriage encoder 51 in a case where a sheet is jammed. The carriage 5 receives an impact at the timing of collision with the sheet. Consequently, the acceleration X shows a swing to the negative side beyond the threshold value and then a swing back in a manner eliminating the impact. The output of the carriage encoder 51 may also be in an abnormal state showing that the movement direction is reversed. Further, in a case where the carriage 5 is stopped by the collision, update of the carriage encoder 51 may also be stopped. In this case, the position counter is not updated within a predetermined time.

<Flowchart of Image Recording Operation>

Figure 13:
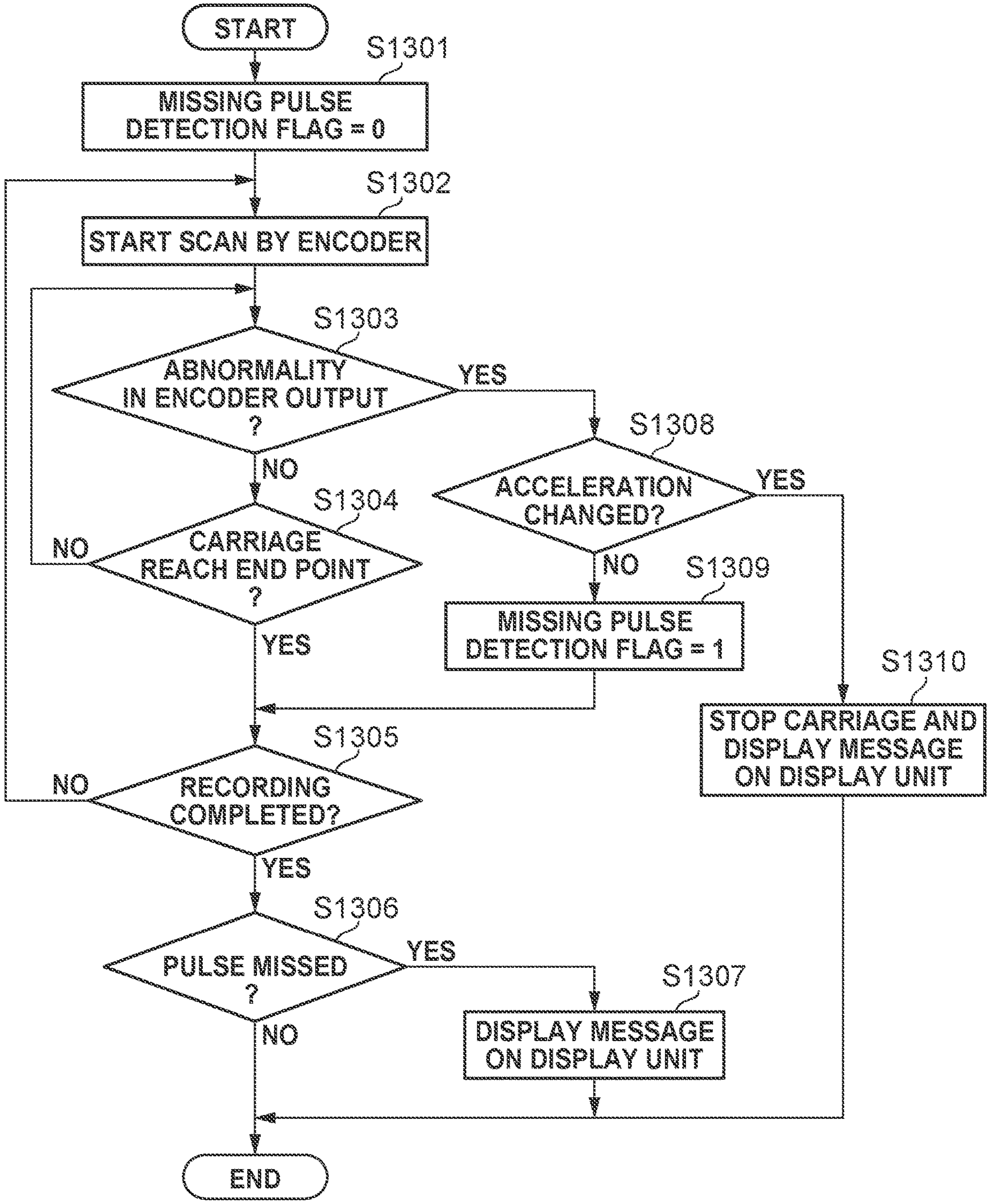
FIG. 13 is a flowchart illustrating an image recording operation.

FIG. 13 is a flowchart illustrating the image recording operation of the recording apparatus 1. The image recording operation is started by the main control unit 41, based on an instruction from the operation panel 100 or an external apparatus.

In step S1301, when the image recording operation is started, the main control unit 41 sets a missing pulse detection flag to "0".

In step S1302, the main control unit 41 starts acquiring the output from the carriage encoder 51. The output is acquired at a predetermined cycle. The main control unit 41 repeats the image recording operation and the sheet conveyance operation and controls recording of an image on a sheet.

In step S1303, the main control unit 41 determines whether there is an abnormality in the output of the carriage encoder 51 other than an end point of the carriage 5, based on information detected by the carriage encoder 51. Examples of the abnormality include a case where there is a reversal for changing the movement direction or a case where the output is not updated within the predetermined time. In a case where there is no abnormality in the encoder output (NO in step S1303), the processing proceeds to step S1304. In a case where there is an abnormality in the encoder output (YES in step S1303), the processing proceeds to step S1308.

In step S1304, the main control unit 41 determines whether the carriage 5 has reached an end point in the width direction of the sheet, based on the carriage encoder 51. The end point is, for example, a position beyond the sheet side end portion. In a case where it is determined that the carriage 5 has not reached the end point (NO in step S1304), the processing returns to step S1303. In a case where it is determined that the carriage 5 has reached the end point (YES in step S1304), the processing proceeds to step S1305.

In step S1305, the main control unit 41 determines whether the image recording operation is completed. In a case where it is determined that the image recording operation is not completed (NO in step S1305), the processing returns to step S1302. In a case where it is determined that the image recording operation is completed (YES in step S1305), the processing proceeds to step S1306.

In step S1308, the main control unit 41 determines whether there is a change in the acceleration more than or equal to the threshold value, based on information detected by the acceleration sensor 52. In a case where there is no change in the acceleration more than or equal to the threshold value (NO in step S1308), the processing proceeds to step S1309. In a case where there is a change in the acceleration more than or equal to the threshold value (YES in step S1308), the processing proceeds to step S1310.

In step S1309, since there is no change in the acceleration more than or equal to the threshold value, the main control unit 41 sets the missing pulse detection flag to "1". This is because it is considered that the pulse is missed due to adhesion of a stain to the scale film 12. A position at which the pulse is missed may be stored, and ink may be ejected from the recording head 5*a* at the position of the missing pulse, based on velocity information. The main control unit 41 continues the image recording operation without stopping the carriage 5 because it is not a sheet jam even in a case where the pulse has been missed.

In step S1306, the main control unit 41 determines a value of the missing pulse detection flag. In a case where the missing pulse detection flag is "0", i.e., pulse missing has not been occurred (NO in step S1306), the image recording operation is ended. In a case where the missing pulse detection flag is "1", i.e., pulse missing has been occurred (YES in step S1306), the processing proceeds to step S1307.

In step S1307, the main control unit 41 controls the operation panel control unit 44 to display the following messages on the operation panel 100: "Please be advised that maintenance time is approaching.", "There is an abnormality in the encoder.", or the like. This is because there may be a case where ink or the like adheres to the scale film 12. A position at which the abnormality occurs in the scale film 12 may be indicated specifically. Then, the image recording operation is ended, based on confirmation by a user or a lapse of a predetermined time.

In step S1310, the main control unit 41 stops the carriage 5 by stopping the carriage motor 53. This is because it is considered that some kind of operation failure, such as a sheet jam, occurs to the carriage 5. Further, the main control unit 41 controls the operation panel control unit 44 to display the following message or the like on the operation panel 100: "An error occurs. Please remove a sheet." This is to prompt a user to remove the sheet jam and the like. As described above, the main control unit 41 can stop the carriage 5, based on first information regarding the position or the velocity detected by the carriage encoder 51 and second information regarding the acceleration detected by the acceleration sensor 52.

According to the present exemplary embodiment, the output from the carriage encoder 51 is directly input to the main control unit 41, and the main control unit 41 determines a movement direction of the carriage 5. However, the determination may be performed independently of the main control unit 41 to reduce a processing load of the main control unit 41.

Further, according to the present exemplary embodiment, the output of the acceleration sensor 52 is directly input to the main control unit 41, and the main control unit 41 determines the state of the carriage 5 based on the input together with a determination result of the movement direction of the carriage 5. However, the determination may be performed independently of the main control unit 41 to reduce a processing load of the main control unit 41.

Conventionally, detection failure may occur in a minute change such as a case where an encoder signal is missed due to ink mist or the like. In such a case, a state of a carriage may not be detected normally. According to the present disclosure, a carriage can be appropriately controlled even in a case where there is an abnormality in an encoder.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-075041, filed Apr. 27, 2021, which is hereby incorporated by reference herein in its entirety.

What is claimed is:

1. A recording apparatus comprising:

a carriage equipped with a recording head that ejects ink to a sheet;

a drive unit configured to move the carriage in a width direction of the sheet;

an encoder configured to detect and output first information regarding a position or a velocity of the carriage that moves by the drive unit;

an acceleration sensor arranged on the carriage and configured to detect second information regarding acceleration of the carriage; and a control unit configured to determine whether there is an abnormality in an output of the encoder based on the first information, wherein after the control unit determines that there is the abnormality in the output of the encoder, (1) in case that the second information regarding the acceleration detected by the acceleration sensor exceeds a threshold value, the control unit stops movement of the carriage, and (2) in case that the second information regarding the acceleration detected by the acceleration sensor does not exceed the threshold value, the control unit does not stop the movement of the carriage.

2. The recording apparatus according to claim 1, wherein the control unit calculates a movement direction of the carriage from the first information.

3. The recording apparatus according to claim 2, wherein the abnormality is that the movement direction is changed while the carriage moves from one side end portion to another side end portion of the sheet.

4. The recording apparatus according to claim 1, wherein the abnormality is that the output from the encoder is not updated within a predetermined time while the carriage moves from one side end portion to another side end portion of the sheet.

5. The recording apparatus according to claim 1, wherein the encoder generates a first signal and a second signal having a phase different from a phase of the first signal.

6. The recording apparatus according to claim 1, wherein, in a case where, based on the first information, the control unit determines that there is the abnormality in the output of the encoder, the control unit causes the acceleration sensor to detect the second information.

7. The recording apparatus according to claim 1, further comprising:

a scale in which a light transmission portion and a non-transmission portion are alternately arranged, wherein the encoder includes a light emitting portion that emits light and a light receiving portion that receives the light from the light emitting portion.

8. The recording apparatus according to claim 1, further comprising a display unit configured to display abnormality information, in the case where the abnormality is that the movement direction of the carriage is changed while the carriage moves from one side end portion to another side end portion of the sheet and the second information regarding the acceleration detected by the acceleration sensor does not exceed the threshold value.

9. The recording apparatus according to claim 8, wherein the display unit displays the abnormality information regarding the abnormality in a case where the movement of the carriage is stopped.

* * * * *